US012656988B2

(12) United States Patent
Li

(10) Patent No.: US 12,656,988 B2
(45) Date of Patent: Jun. 16, 2026

(54) ALWAYS-ON DISPLAY METHOD AND APPARATUS, AND DEVICE AND STORAGE MEDIUM

(71) Applicant: GUANGDONG OPPO MOBILE TELECOMMUNICATIONS CORP., LTD., Dongguan (CN)

(72) Inventor: Zhiwen Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 19/048,461

(22) Filed: Feb. 7, 2025

(65) Prior Publication Data

US 2025/0244938 A1     Jul. 31, 2025

Related U.S. Application Data

(63) Continuation of application No. PCT/CN2023/100005, filed on Jun. 13, 2023.

(30) Foreign Application Priority Data

Aug. 10, 2022     (CN) .......................... 202210957413.3

(51) Int. Cl.
  *G06F 3/00*      (2006.01)
  *G06F 3/14*      (2006.01)
  *G06F 9/451*     (2018.01)

(52) U.S. Cl.
  CPC ............... *G06F 3/14* (2013.01); *G06F 9/451* (2018.02)

(58) Field of Classification Search
  CPC .... G06F 1/3265; G06F 1/3287; G06F 1/3293; G06F 3/14; G06F 9/4418; G06F 9/451
  See application file for complete search history.

(56) References Cited

U.S. PATENT DOCUMENTS

2021/0373833 A1* 12/2021 Pawar .................. G09G 3/3406
2023/0004406 A1   1/2023 Hu et al.

FOREIGN PATENT DOCUMENTS

| CN | 112783274 A | 5/2021 |
| EP | 4250102 A1 | 9/2023 |
| WO | 2021104104 A1 | 6/2021 |

OTHER PUBLICATIONS

International Search Report and Written Opinion in International Application No. PCT/CN2023/100005, mailed on Sep. 20, 2023 with English translation provided by WIPO.

(Continued)

*Primary Examiner* — Insa Sadio
(74) *Attorney, Agent, or Firm* — Ladas & Parry, LLP

(57)     ABSTRACT

An always-on display method, a device, and a storage medium. The method is performed by an electronic device; the electronic device supports running a first system and a second system, and an operating power consumption of the first system is higher than that of the second system. The method includes: displaying, by the first system, a first application interface of a first application in an always-on display state; sending, by the first system, a state entry command to the second system, where the state entry command is configured to instruct the second system to enter the always-on display state; displaying, by the second system, a second application interface of a second application in the always-on display state based on the state entry command, wherein the second application and the first application support an always-on display state transition; and entering, by the first system, a dormant state.

25 Claims, 9 Drawing Sheets

(56)  References Cited

OTHER PUBLICATIONS

European Search Report from corresponding European patent Application No. 23851368.3, mailed Oct. 22, 2025 (10 pages).

* cited by examiner

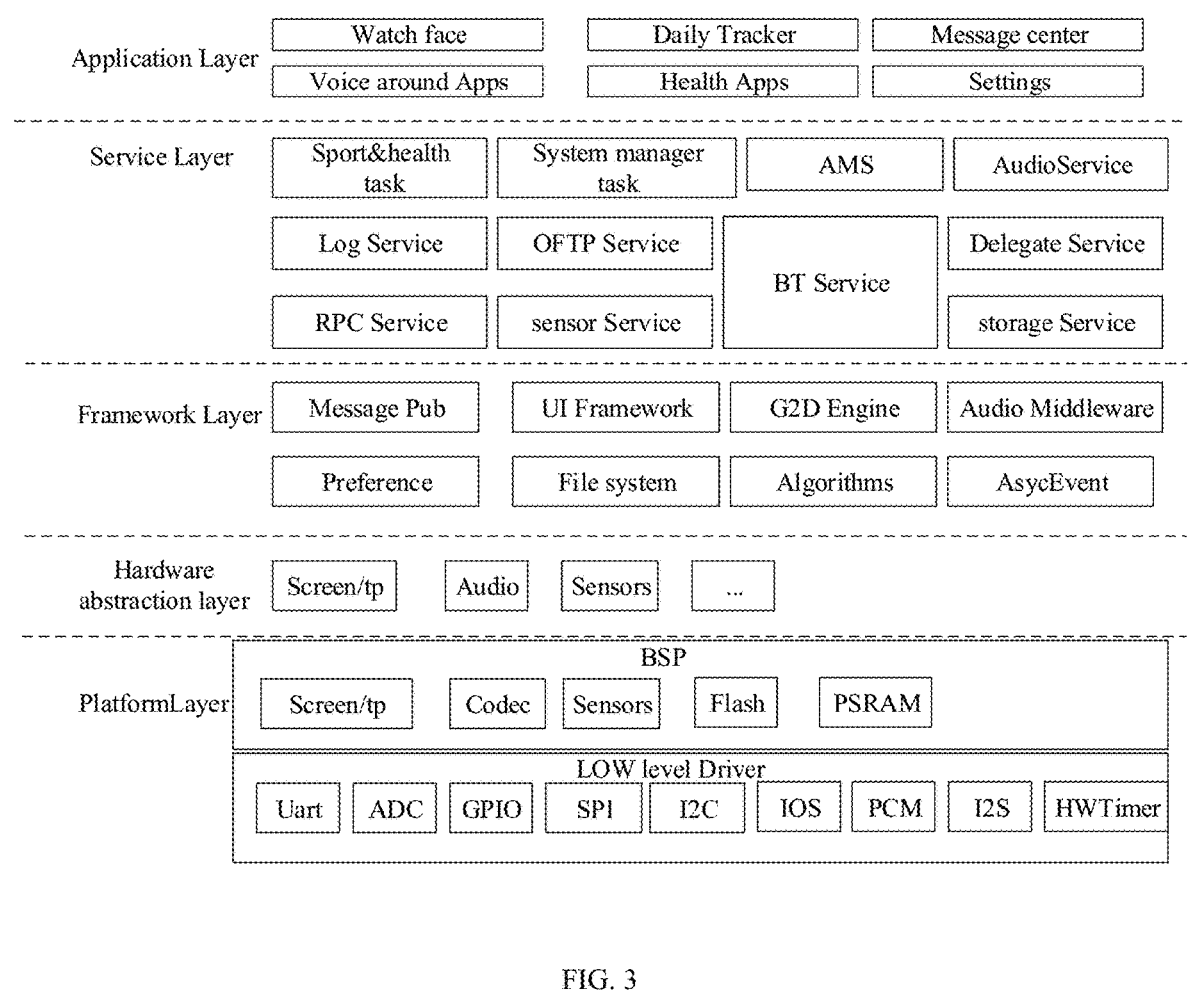

| Application Layer | Watch face | Daily Tracker | Message center |
|---|---|---|---|
| | Voice around Apps | Health Apps | Settings |

| Service Layer | Sport&health task | System manager task | AMS | AudioService |
|---|---|---|---|---|
| | Log Service | OFTP Service | BT Service | Delegate Service |
| | RPC Service | sensor Service | | storage Service |

| Framework Layer | Message Pub | UI Framework | G2D Engine | Audio Middleware |
|---|---|---|---|---|
| | Preference | File system | Algorithms | AsycEvent |

| Hardware abstraction layer | Screen/tp | Audio | Sensors | ... |
|---|---|---|---|---|

PlatformLayer

BSP

| Screen/tp | Codec | Sensors | Flash | PSRAM |
|---|---|---|---|---|

LOW level Driver

| Uart | ADC | GPIO | SPI | I2C | IOS | PCM | I2S | HWTimer |
|---|---|---|---|---|---|---|---|---|

FIG. 3

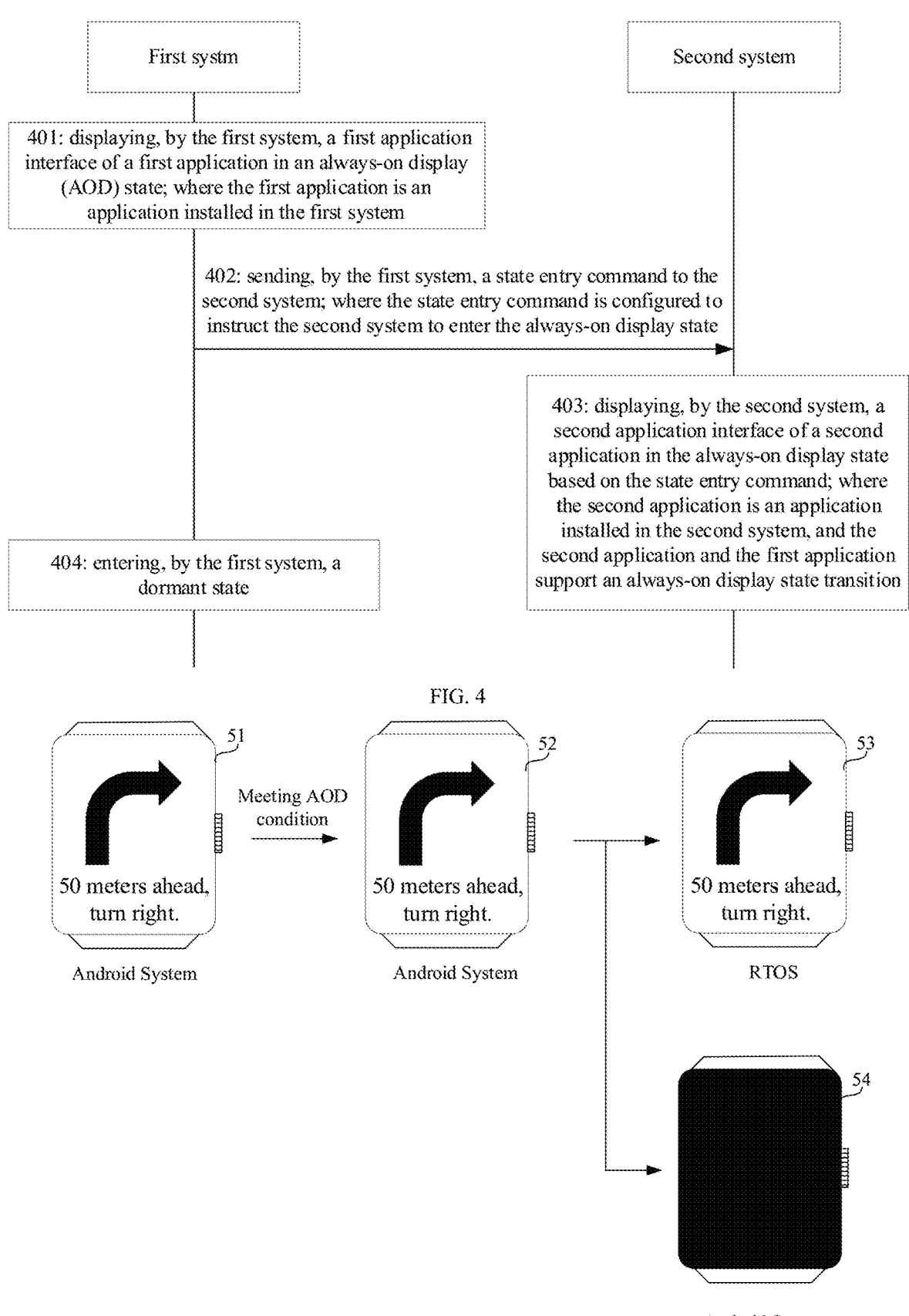

First systm

401: displaying, by the first system, a first application interface of a first application in an always-on display (AOD) state; where the first application is an application installed in the first system 402: sending, by the first system, a state entry command to the second system; where the state entry command is configured to instruct the second system to enter the always-on display state 404: entering, by the first system, a dormant state Second system 403: displaying, by the second system, a second application interface of a second application in the always-on display state based on the state entry command; where the second application is an application installed in the second system, and the second application and the first application support an always-on display state transition

50 meters ahead, turn right.

Android System

Meeting AOD condition

52

50 meters ahead, turn right.

Android System

53

50 meters ahead, turn right.

RTOS

54

Android System

FIG. 5

Android system                    Android system

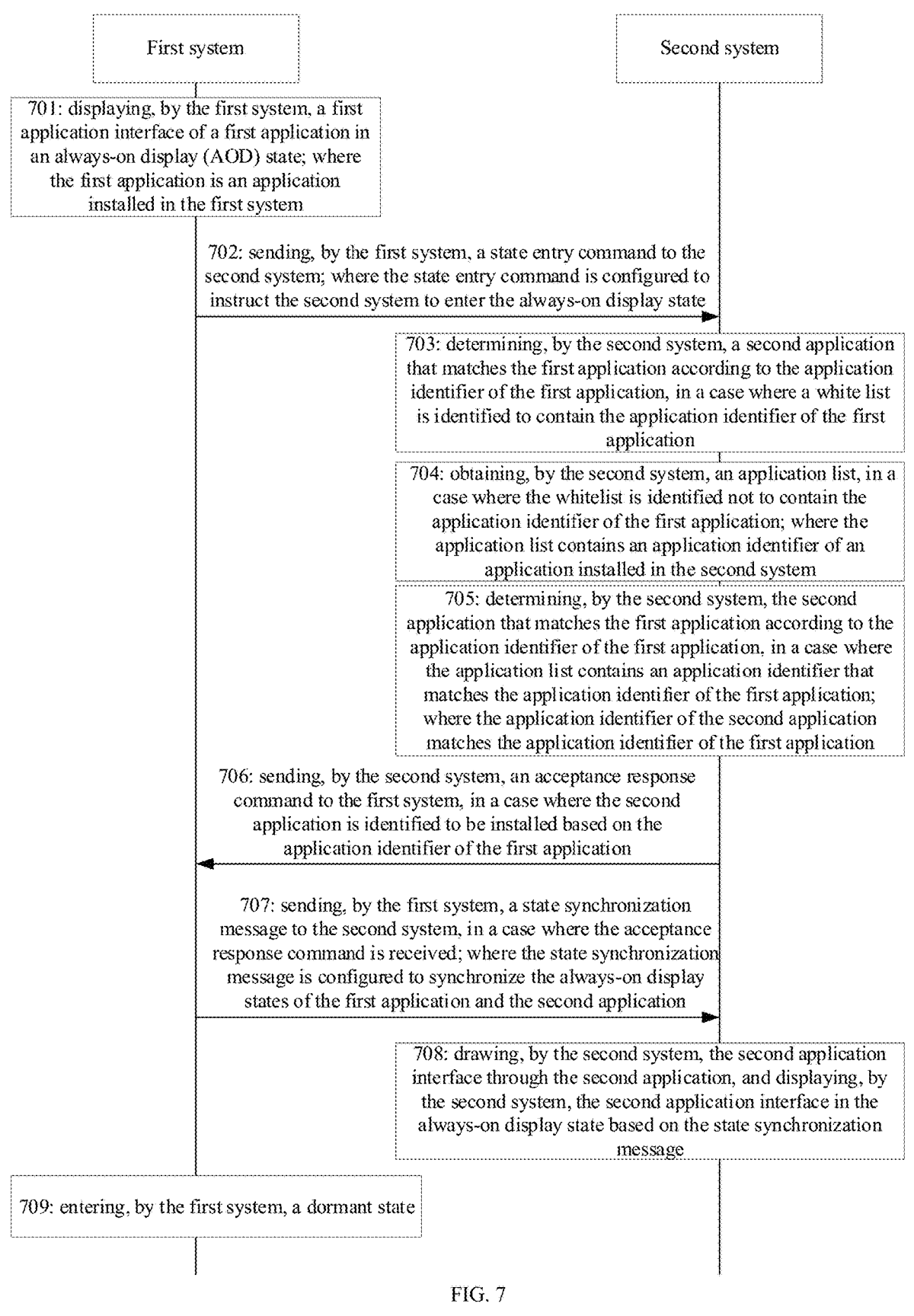

First system

Second system

701: displaying, by the first system, a first application interface of a first application in an always-on display (AOD) state; where the first application is an application installed in the first system 702: sending, by the first system, a state entry command to the second system; where the state entry command is configured to instruct the second system to enter the always-on display state 703: determining, by the second system, a second application that matches the first application according to the application identifier of the first application, in a case where a white list is identified to contain the application identifier of the first application 704: obtaining, by the second system, an application list, in a case where the whitelist is identified not to contain the application identifier of the first application; where the application list contains an application identifier of an application installed in the second system 705: determining, by the second system, the second application that matches the first application according to the application identifier of the first application, in a case where the application list contains an application identifier that matches the application identifier of the first application; where the application identifier of the second application matches the application identifier of the first application 706: sending, by the second system, an acceptance response command to the first system, in a case where the second application is identified to be installed based on the application identifier of the first application 707: sending, by the first system, a state synchronization message to the second system, in a case where the acceptance response command is received; where the state synchronization message is configured to synchronize the always-on display states of the first application and the second application 708: drawing, by the second system, the second application interface through the second application, and displaying, by the second system, the second application interface in the always-on display state based on the state synchronization message 709: entering, by the first system, a dormant state

FIG. 7

ALWAYS-ON DISPLAY METHOD AND APPARATUS, AND DEVICE AND STORAGE MEDIUM

CROSS-REFERENCE TO RELATED APPLICATIONS

The present application is a continuation-application of International (PCT) Patent Application No. PCT/CN2023/100005, filed on Jun. 13, 2023, which claims priority of Chinese Patent Application No. 202210957413.3, filed on Aug. 10, 2022, the entire contents of which are hereby incorporated by reference in their entirety.

TECHNICAL FIELD

The present disclosure relates to the technical field of electronic devices, in particular to an always-on display method, a device, and a storage medium.

BACKGROUND

With the continuous development of science and technology, more and more electronic devices with different functions have emerged, bringing many conveniences to users' daily lives.

Taking wearable devices as an example, after a wearable device is bound to a smartphone, the wearable device can not only display notifications from the smartphone, but also enable an always-on display function.

SUMMARY OF THE DISCLOSURE

The present disclosure provides an always-on display method, a device, and a storage medium.

In a first aspect, the embodiments of the present disclosure provide an always-on display method, performed by an electronic device; wherein the electronic device supports running a first system and a second system, and an operating power consumption of the first system is higher than an operating power consumption of the second system; the method includes: displaying, by the first system, a first application interface of a first application in an always-on display state; wherein the first application is an application installed in the first system; sending, by the first system, a state entry command to the second system; wherein the state entry command is configured to instruct the second system to enter the always-on display state; displaying, by the second system, a second application interface of a second application in the always-on display state based on the state entry command; wherein the second application is an application installed in the second system, and the second application and the first application support an always-on display state transition; and entering, by the first system, a dormant state.

In a second aspect, the embodiments of the present disclosure provide an electronic device, including a processor and a memory; wherein the memory stores at least one segment of a program, the at least one segment of the program being configured to be executed by the processor to implement the method as above.

In a third aspect, the embodiments of the present disclosure provide a computer-readable storage medium, storing at least one segment of a program; wherein the at least one segment of the program is configured to be executed by a processor to implement the method as above.

BRIEF DESCRIPTION OF THE DRAWINGS

In order to more clearly illustrate the technical solution in the embodiments of the present disclosure, the following is a brief description of the drawings needed to be used in the description of the embodiments. Obviously, the drawings described below are only some embodiments of the present disclosure. For those skilled in the art, without the expenditure of creative labor, other drawings can be obtained based on these drawings.

FIG. 3 is a schematic diagram of a dual-core communication software framework of a real-time operating system (RTOS) according to some embodiments of the present disclosure.

FIG. 4 is a flowchart of an always-on display method according to some embodiments of the present disclosure.

FIG. 5 is a schematic diagram of an electronic device performing an always-on display according to some embodiments of the present disclosure.

FIG. 7 is a flowchart of an always-on display method according to other embodiments of the present disclosure.

DETAILED DESCRIPTION

Figure 1:
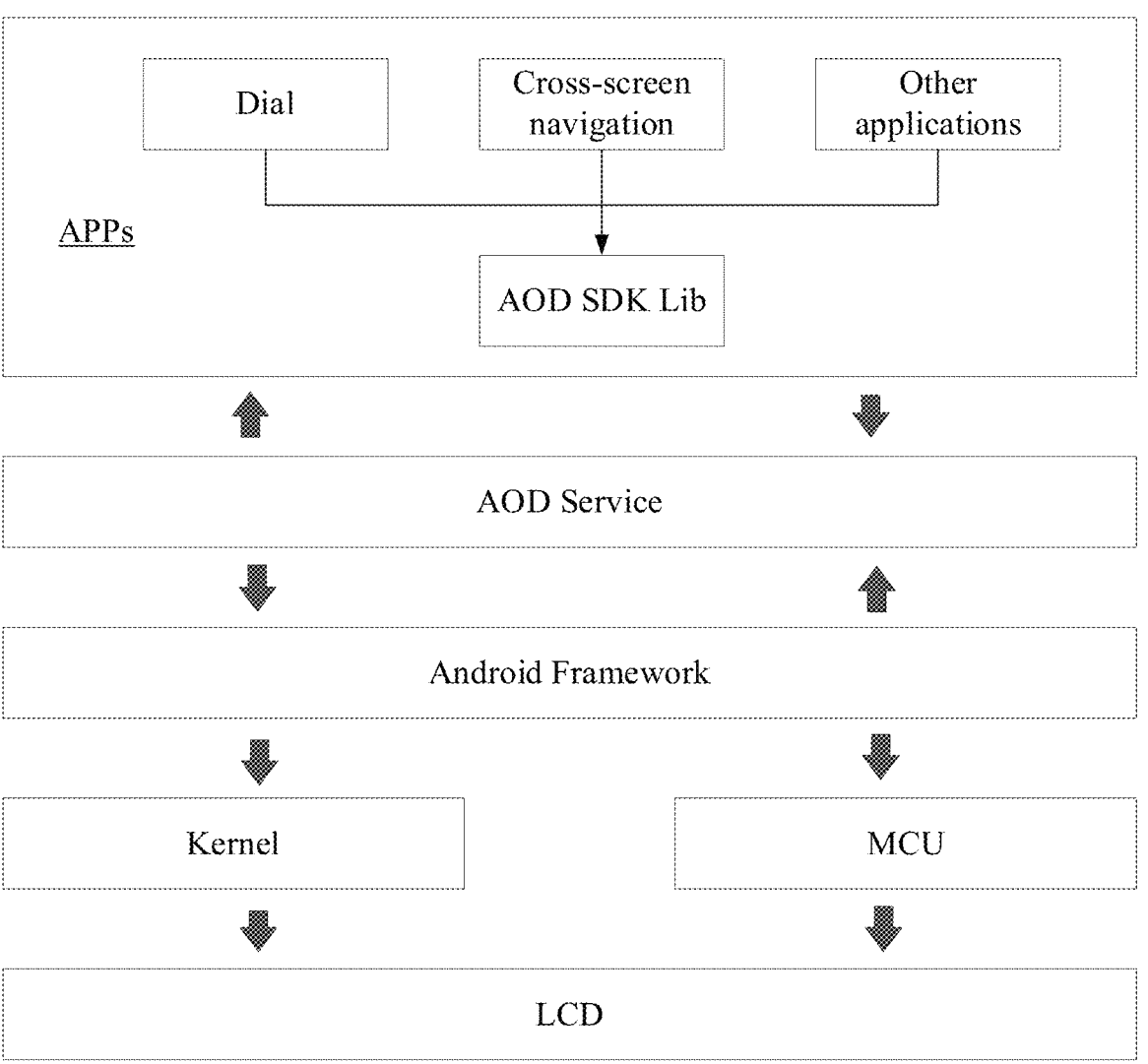
FIG. 1 is a schematic diagram of a hardware and software architecture of an electronic device according to some embodiments of the present disclosure.

In order to make the purpose, technical solution, and advantages of the present disclosure clearer, the following will further describe in detail the implementation of the present disclosure in conjunction with the accompanying drawings.

In this text, the word "multiple" refers to two or more. The word "and/or" describes an association between related objects, indicating that there may be three types of relationships. For example, "A and/or B" may indicate the following three situations: A alone, A and B together, and B alone. The character "/" generally indicates an "or" relationship between related objects.

With the increasing use of electronic devices, the Always-On Display (AOD) function on electronic devices has gradually become a common feature. The always-on display function allows the system to display some data on the screen with low power consumption while it is in a dormant state. Taking wearable devices as an example, after a wearable device is bound to a smartphone, when a user needs to view data such as time or map navigation, there is no need to frequently raise the wrist to make the device screen light up for the user to view the content displayed by the device. The user can simply look down to see the required data, which greatly improves the user experience and further effectively enhances the aesthetics of screen display of the wearable device.

In the related art, the electronic device is arranged with a single processor, and the always-on display function is implemented through an operating system running on the processor. However, in daily use, the electronic device is only required to perform functions that require low processing power in most cases. For example, for smart watches or smart bracelets, most of the time, they are only required to display the time and send notifications. Therefore, it is unnecessary for the processor to remain in operation for a long time. It is well known that leaving the processor in operation for a long time will increase the power consumption of the device, which will shorten the battery life of the electronic device (especially obvious in wearable devices with small battery capacity).

In order to reduce the power consumption of the electronic device while ensuring its performance, in a possible implementation, the electronic device is arranged with at least a first processor and a second processor with different processing capabilities and power consumptions, which are configured to run a first system and a second system, respectively (i.e., dual-core dual-system).

When the dual-system electronic device implements the always-on display function, taking a wearable device as an example, the relevant art is that when the dual-system cooperates to perform the always-on display function, the only scenario that is supported is AOD on the dial. Whenever the higher-performance first system is displaying the AOD of another scenario, the first system can only continue to display the AOD of that scenario. Further, since it is not possible to switch to the lower-performance second system, every time the user raises his/her wrist, the first system is directly woken up to perform the always-on display, which greatly increases the power consumption burden on the electronic device.

In order to solve the problem of power consumption caused by frequent wake-up of the first system, the embodiments of the present disclosure provide a solution in which, for an electronic device supporting dual-system, in the presence of a need for an always-on display, the high-power-consumption first system sends a state entry command to the low-power-consumption second system to instruct the second system to enter an always-on display state, and then the first system enters a dormant state while the second system displays a second application interface of a second application (which supports an always-on display state transition with a first application) in the always-on display state. This solution can ensure the normal operation of the AOD function of the electronic device, while avoiding the problem of high-power consumption of the electronic device caused by the high-performance system needing to remain in operation for a long time when implementing the AOD function, which helps reduce the power consumption of the electronic device and improve the battery life of the electronic device.

In the embodiments of the present disclosure, the first processor and the second processor work asynchronously, and the first system and the second system are required to implement system communication (or dual-core communication). In a possible application scenario, the first system is an Android operating system running on a central processing unit (CPU), and the second system is a real-time operating system (RTOS) running on a microcontroller unit (MCU).

Referring to FIG. 1, FIG. 1 is a schematic diagram of a hardware and software architecture of an electronic device according to some embodiments of the present disclosure. The electronic device mainly includes six modules: APPs (applications), AOD service, Android Framework, Kernel, MCU, and LCD (screen).

Among them, the APPs module includes dial, cross-screen navigation, music player, information notification bar, and another AOD software development kit library (SDK Lib) that supports always-on display. In other words, each application in the APPs module has AOD functionality. The interface within the application can be in two states: normal state and AOD state. When the application is running in the foreground, and the electronic device meets an always-on display condition, the interface of the application can enter the AOD state.

The AOD service module is the core service in the electronic device to schedule the APPs module, configured to confirm whether the current foreground interface has AOD function, and to inform an interface to enter the AOD state.

In the embodiments of the present disclosure, both the first system and the second system support the AOD service. In some embodiments, the first system and the second system each have their own AOD service module, such that each of the first system and the second system can implement the AOD function by scheduling applications in the APPs module through its corresponding AOD service module. Alternatively, the AOD service module is shared by the first system and the second system. The calling permissions of the AOD service module can be switched between the first system and the second system in different scenarios, i.e., the AOD service module can be called by the first system or the second system. For example, the second system can call the AOD service module only after the first system has exited the call to the AOD service module.

The Android Framework and Kernel modules together form the first system, i.e., the Android system, and the MCU module is the second system, i.e., the RTOS.

The LCD module is the screen of the electronic device and is configured to display a graphical user interface and/or to receive user interaction.

Figure 2:
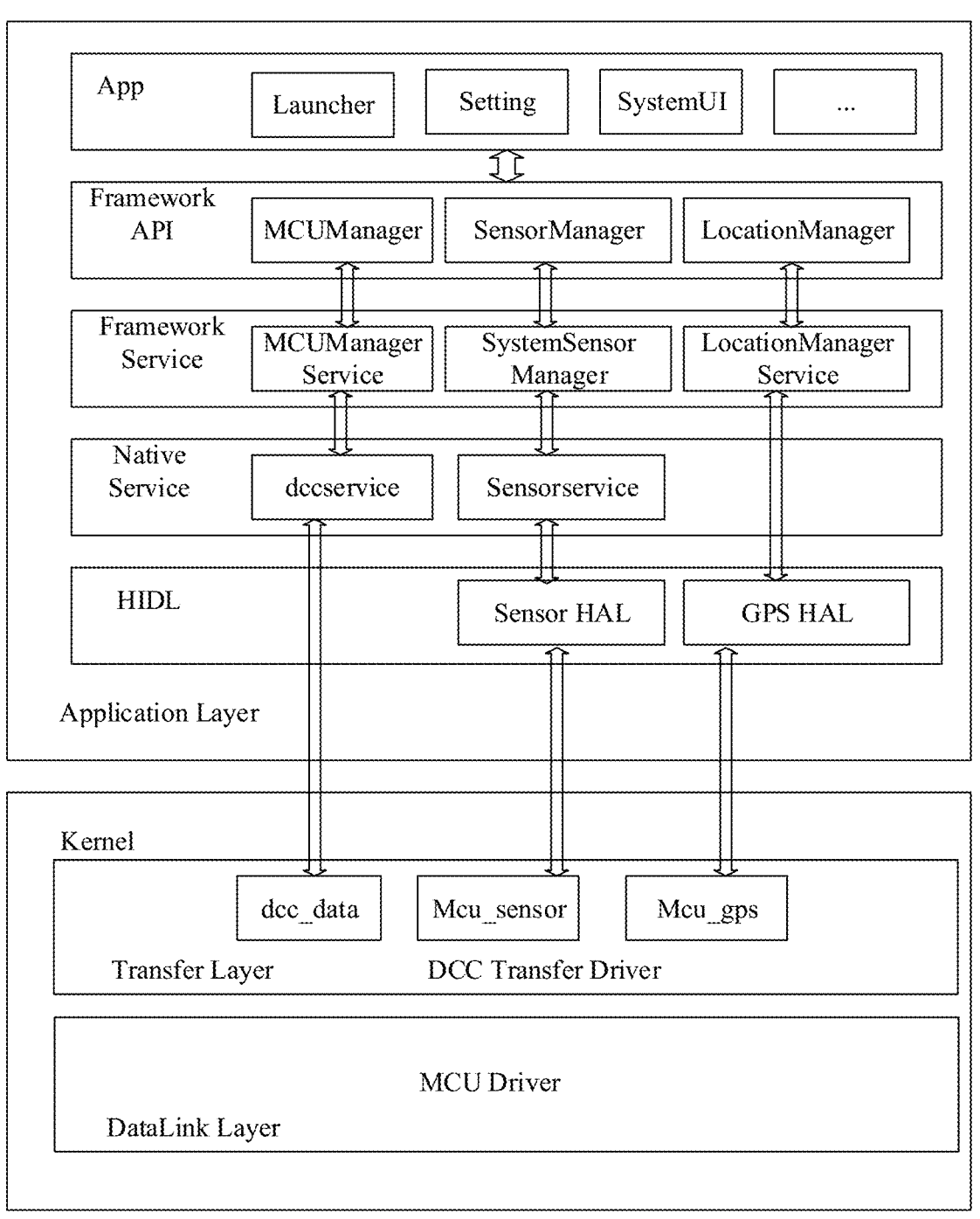
FIG. 2 is a schematic diagram of a dual-core communication software framework of an Android operating system according to some embodiments of the present disclosure.

As shown in FIG. 2, FIG. 2 is a schematic diagram of a dual-core communication software framework of an Android operating system according to some embodiments of the present disclosure. The dual-core communication software framework follows the design principles of "low coupling, high reliability, and high reuse", and includes the development of modules for Kernel, HIDL (Hardware Abstraction Layer Interface Description Language), Native Service, Framework Service, Framework API, and APP sections.

The APP module includes functional modules such as Launcher, Setting, and SystemUI. The Framework API module includes management modules such as MCUManager, SensorManager, and LocationManager. The Framework Service module includes service modules such as MCUManagerService, SystemSensorManager, and LocationManagerService. The Native Service module includes service modules such as dccservice and Sensorservice. The HIDL module includes modules such as Sensor HAL and GPS HAL. The Kernel module includes DCC Transfer Drivers such as dcc_data, Mcu_sensor, and Mcu_gps.

The transport layer serves as an interface layer in the dual-core communication software framework that connects the upper and lower layers, shielding the application layer from the transport details of communication in the lower layer (data link layer) of the system and providing a service channel for application scenarios. The application layer serves as the main body of service provisioning, responding to human-machine interaction and transmitting data generated during human-machine interaction through the transport layer, as well as responding to external data requests.

The RTOS is designed using a peer-to-peer principle. Taking an electronic device being a smartwatch as an example, as shown in FIG. 3, FIG. 3 is a schematic diagram of a dual-core communication software framework of a real-time operating system (RTOS) according to some embodiments of the present disclosure.

The RTOS's dual-core communication software framework is divided into an application layer, a service layer, a framework layer, a hardware abstraction layer, and a platform layer.

The application layer includes application modules such as dial, Daily Tracker, Message center, Voice around Apps, Health Apps, and Settings. The service layer includes service modules such as Sport&health task, System manager task, AMS (activity management service), Audio Service, Log Service, OFTP (Odette File Transfer Protocol) Service, BT (Bluetooth) Service, Delegate Service, RPC (Remote Procedure Call) Service, sensor Service, storage Service, and other service modules. The framework layer includes Message Pub, UI Framework, G2D Engine, Audio Middleware, Preference, File system, Algorithms, AsycEvent, and other framework modules. The hardware abstraction layer includes hardware abstraction modules such as Screen/TP (screen/touch screen) and sensors. The platform layer includes the Board Support Package (BSP) and Low-level Driver, where BSP includes Screen/TP, Codec (codec), sensors, Flash, PSRAM (pseudo-static random memory), etc., and Low-level driver includes Uart (Universal Asynchronous Receiver and Transmitter), ADC (analog-to-digital converter), GPIO (general-purpose input/output), SPI (serial peripheral interface), I2C (Integrated Circuit Bus), IOS (Input Output System), PCM (Pulse Code Modulation), I2S (Integrated Audio Bus), HWTimer (Hardware Timer).

It should be noted that the above dual-core communication software framework is only used for illustrative purposes. Those skilled in the art may add, delete, or modify the above framework according to actual needs. The embodiments of the present disclosure do not limit the specific structural composition of the dual-core communication software framework.

Referring to FIG. 4, FIG. 4 is a flowchart of an always-on display method according to some embodiments of the present disclosure. The embodiments are described and illustrated by taking an example where the method is applied to an electronic device and the electronic device supports running a first system and a second system (the operating power consumption of the first system is higher than that of the second system). The method may include operations at blocks illustrated herein.

At block 401: displaying, by the first system, a first application interface of a first application in an always-on display (AOD) state; where the first application is an application installed in the first system.

In order to reduce the power consumption of the electronic device while ensuring its performance, in a possible implementation, the electronic device is arranged with at least a first processor and a second processor with different processing capabilities and power consumptions, which are configured to run the first system and the second system, respectively (i.e., dual-core dual-system). During operation of the electronic device, the low-power-consumption system (which can be either the first system or the second system) running on the low-power processor handles events with low processing requirements, and keeps the high-power processor in a dormant state (correspondingly, the high-power-consumption system running on the high-power processor is in a dormant state), thereby reducing the power consumption of the electronic device while achieving its basic functions. When an event with high-performance processing requirements occurs, the high-power processor is woken up and the high-power-consumption system is switched to process the event, thereby ensuring that the triggered event can be responded to and processed in a timely manner to meet the performance requirements of the electronic device.

In a possible implementation, the electronic device is arranged with a first processor and a second processor, where the processing performance of the first processor is higher than the processing performance of the second processor (i.e., the processing capability and processing speed of the first processor are higher than those of the second processor), and the power consumption of the first processor is higher than the power consumption of the second processor. Accordingly, the operating power consumption of the first system run by the first processor is higher than the operating power consumption of the second system run by the second processor. Therefore, the first system can process events processed by the second system, while the second system may not be able to process events processed by the first system.

In another possible implementation, the electronic device may be arranged with a single processor, where the first system and the second system are respectively run on different cores of the processor. The processing performance of the core running the first system is higher than the processing performance of the core running the second system.

For example, in a case of the electronic device such as a smartwatch, the first processor is a CPU and the second processor is an MCU, the first system is Android and the second system is RTOS. Accordingly, the events that can be processed by the first system include scenarios or highly interactive scenarios that require high processing performance, such as answering an incoming call, replying to a message, and setting functions; the events that can be processed by the second system include scenarios or weakly interactive scenarios that require low processing performance, such as displaying the time and displaying notification messages.

Unlike electronic devices with strong interactive attributes such as smartphones, wearable devices, as auxiliary electronic devices, only have weak interactions with users in most usage scenarios. For example, in most scenarios, users only raise their wrists to check the time with their smartwatches. Therefore, in most scenarios, the wearable device can control only the second system to process events, and control the first processor to be in the dormant state (i.e., the first system is in the dormant state). When there is an event with high-performance processing requirements, the first processor is woken up to run the first system to process the event, thereby reducing the overall power consumption of the wearable device.

In the embodiments of the present disclosure, the first system of the electronic device displays the first application interface of the first application via the AOD service in the always-on display state, and the first application is an application installed in the first system with AOD function.

In some embodiments, before the first system of the electronic device displays the first application interface of the first application in the always-on display state, the first system remains in a screen-on display state for a period of time, and the first application interface of the first application will be displayed in the screen-on display state.

In some embodiments, there is a difference between the first application interface displayed by the first system in the screen-on display state and the first application interface in the always-on display state. The difference may be, for example, a difference in the richness of the interface details, a difference in contrast, a difference in color richness, a difference in brightness, etc., which is not limited herein.

In some embodiments, since the first application interface of the first application may support or not support always-on display, the first system first determines through the AOD service whether the first application interface of the first application supports always-on display, and then displays the first application interface of the first application in the always-on display state when the device state meets an always-on display condition and the first application interface supports the always-on display.

In some embodiments, the always-on display condition may include the electronic device being in a time-out idle state (e.g., no user command is received for a period of 5 seconds), a screen-off wearing state (hands-free, hands-covered, etc.), etc., which is not limited herein.

In some embodiments, after the device state meets the always-on display condition, the first system further detects a wearing state and a working state (sleep state or non-sleep state) of the electronic device through the AOD service. In a case where the electronic device is in a worn state and the working state of the electronic device is the non-sleep state, the first system further determines whether the first application interface of the first application supports the always-on display; in a case where the electronic device is in the worn state and the working state of the electronic device is the sleep state, the first system directly enters a screen-off state.

In some embodiments, since it is unnecessary that all application interfaces of an application with the AOD function support the always-on display, the first system first identifies the first application to determine whether the first application is an application with AOD function before determining whether the first application interface of the first application supports always-on display through the AOD service. After determining that the first application is an application with AOD function, the first system further identifies the first application interface to determine whether the first application interface has AOD function, that is, the first system determines whether the first application interface of the first application supports the always-on display.

Schematically, referring to FIG. 5, taking the wearable device being a smartwatch as an example, the smartwatch is arranged with an Android system (run by the first processor) and an RTOS (run by the second processor). Taking the first application as a navigation application as an example, the first application interface displayed by the Android system in the screen-on state is a route display interface 51, and the route display interface 51 supports the always-on display, and when the device state of the smartwatch meets the always-on display condition, the Android system displays a route display interface 52 in the always-on display state.

At block 402: sending, by the first system, a state entry command to the second system; where the state entry command is configured to instruct the second system to enter the always-on display state.

In a possible implementation, after the first system displays the first application interface of the first application in the always-on display state through the AOD service, the first system sends the state entry command to the second system through a dual-core communication mechanism to instruct the second system to enter the always-on display state.

In another possible implementation, the first system does not immediately send the state entry command to the second system after entering the always-on display state, but instead sends the state entry command to the second system to instruct the second system to enter the always-on display state when the duration of entering the always-on display state reaches a duration threshold.

For example, when the duration threshold is 3 s, then after the first system has displayed the first application interface of the first application in the always-on display state for 3 s, the first system sends the state entry command to the second system to instruct the second system to enter the always-on display state.

At block 403: displaying, by the second system, a second application interface of a second application in the always-on display state based on the state entry command; where the second application is an application installed in the second system, and the second application and the first application support an always-on display state transition.

In a possible implementation, before the second system displays the second application interface of the second application in the always-on display state based on the state entry command, the first system transfers a screen control authority to the second system to ensure that the second system can normally display the second application interface after obtaining the screen control authority.

In some embodiments, after obtaining the screen control authority in the wake-up state, the second system performs a screen refresh operation to display the second application interface of the second application through the screen in the always-on display state.

Further, after the second system obtains the state entry command sent by the first system, the second system displays the second application interface of the second application in the always-on display state based on the state entry command through the AOD service.

In some embodiments, after obtaining the state entry command, the second system starts the second application, such that the second system subsequently displays the second application interface of the second application which is the same as the first application interface of the first application.

In some embodiments, the second application and the first application are applications with the same function installed separately in the second system and the first system; or, the second application and the first application are the same application installed separately in the second system and the first system; or, the second application and the first application are applications with the same application interface installed separately in the second system and the first system.

In some embodiments, the second system and the first system can communicate with each other via dual-core communication to achieve the always-on display state transition, such that the second system displays the second application interface of the second application in the always-on display state based on the state entry command.

In some embodiments, the second application interface of the second application and the first application interface of the first application are interfaces with the same function, and the interface display content can be exactly the same or not exactly the same.

At block 404: entering, by the first system, a dormant state.

In a possible implementation, after the first system transfers the screen control authority to the second system, it shuts down the AOD service, stops displaying the first application interface of the first application in the always-on display state, and enters the dormant state.

In some embodiments, while the first system is in the dormant state, the electronic device shuts down most of the hardware modules in the first processor, transfers all relevant data of the first system to a hibernation file on the read-only memory (ROM), and then cuts off the power supply to the first processor. After the second system sends a wake-up message to the first system, the electronic device restores the power supply to the first processor, the first system reads the content of the hibernation file on the hard disk directly into the random-access memory (RAM), and the first system switches to the wake-up state.

It should be noted that there are generally four operating states for electronic devices: S1: operating state, S2 or S3: sleep state, S4: dormant state, and S5: shutdown state. The power-on state and power-off state of the processor in different operating states can be different, which is not limited herein. For example, in phase S1, the processor remains powered on, but at this time the processor may not perform computing tasks, and in S2 and later phases, the processor is in the powered-off state.

For example, as shown schematically in FIG. 5, taking the wearable device being a smartwatch as an example, the smartwatch is arranged with an Android system (run by the first processor) and an RTOS (run by the second processor). In a case where both the first processor and the second processor are in the wake-up state, and where the first application and the second application are both navigation applications and the first application interface and the second application interface are both route display interfaces, the Android system displays the route display interface 51 in the screen-on state. Since the route display interface 51 supports the always-on display, when the device state of the smartwatch meets the always-on display condition, the Android system can display the route display interface 52 in the always-on display state and send a state entry command to the RTOS system to instruct the RTOS system to enter the always-on display state, such that the RTOS system can display a route display interface 53 on the screen in the always-on display state. At this time, the Android system enters the dormant state and displays an always-on display interface 54.

In summary, in the embodiments of the present disclosure, for an electronic device supporting dual-system, in the presence of a need for an always-on display, the high-power-consumption first system first displays the first application interface of the first application in the always-on display state, and sends a state entry command to the low-power-consumption second system to instruct the second system to enter the always-on display state, such that after the second system displays the second application interface of the second application in the always-on display state, the first system enters the dormant state. This solution can ensure the normal operation of the AOD function of the electronic device, while avoiding the problem of high power consumption of the electronic device caused by the high-performance system needing to remain in operation for a long time when implementing the AOD function, which helps reduce the power consumption of the electronic device and improve the battery life of the electronic device.

In some embodiments, the state entry command includes an application identifier of the first application.

The displaying, by the second system, a second application interface of a second application in the always-on display state based on the state entry command includes:
displaying, by the second system, the second application interface of the second application in the always-on display state, in a case where the second application is identified to be installed based on the application identifier of the first application.

In some embodiments, the electronic device stores a whitelist, and the whitelist contains an application identifier of at least one frequently-used application that supports always-on display state transition.

Before the displaying, by the second system, the second application interface of the second application in the always-on display state, in a case where the second application is identified to be installed based on the application identifier of the first application, the method further includes:
determining, by the second system, the second application that matches the first application according to the application identifier of the first application, in a case where the white list is identified to contain the application identifier of the first application; and/or
obtaining, by the second system, an application list, in a case where the white list is identified not to contain the application identifier of the first application; where the application list contains application identifiers of applications installed in the second system;
determining, by the second system, the second application that matches the first application according to the application identifier of the first application, in a case where the application list contains an application identifier that matches the application identifier of the first application; where an application identifier of the second application matches the application identifier of the first application.

In some embodiments, the method further includes:
sending, by the second system, an acceptance response command to the first system in a case where the second application is identified to be installed based on the application identifier of the first application; and
sending, by the first system, a state synchronization message to the second system, in a case where the acceptance response command is received; where the state synchronization message is configured to synchronize the always-on display states of the first application and the second application.

The displaying, by the second system, the second application interface of the second application in the always-on display state includes:
drawing, by the second system, the second application interface through the second application, and displaying, by the second system, the second application interface in the always-on display state based on the state synchronization message.

In some embodiments, the method further includes:
sending, by the second system, a rejection response command to the first system, in a case where the second application is identified not to be installed based on the application identifier of the first application; and
continuing, by the first system, to display the first application interface of the first application in the always-on display state, in a case where the rejection response command is received.

In some embodiments, the state entry command includes an application identifier of the second application.

The displaying, by the second system, a second application interface of a second application in the always-on display state based on the state entry command includes:

displaying, by the second system, the second application interface of the second application in the always-on display state based on the application identifier of the second application.

In some embodiments, the sending, by the first system, a state entry command to the second system includes:

querying, by the first system, the second application based on the application identifier of the first application from a state transition table; where the state transition table contains a correspondence between applications supporting always-on display state transition in the first system and the second system, and the state transition table is generated based on applications installed in the first system and applications installed in the second system; and sending, by the first system, the state entry command that contains the application identifier of the second application to the second system, in a case where the second application is found.

In some embodiments, after the querying, by the first system, the second application, the method further includes:

continuing, by the first system, to display the first application interface of the first application in the always-on display state, in a case where the second application is not found.

In some embodiments, the state entry command contains a state synchronization message, which is configured to synchronize the always-on display states of the first application and the second application.

The displaying, by the second system, the second application interface of the second application in the always-on display state based on the application identifier of the second application includes:

starting, by the second system, the second application based on the application identifier of the second application; and drawing, by the second system, the second application interface through the second application, and displaying, by the second system, the second application interface in the always-on display state based on the state synchronization message.

In some embodiments, before the displaying, by the second system, the second application interface of the second application in the always-on display state, the method further includes:

transferring, by the first system, a screen control authority to the second system.

In some embodiments, before the displaying, by the first system, the first application interface of the first application in the always-on display state, the method further includes:

displaying, by the first system, the first application interface of the first application in a screen-on display state.

The displaying, by the first system, the first application interface of the first application in the always-on display state includes:

displaying, by the first system, the first application interface of the first application in the always-on display state, in a case where a device state meets an always-on display condition and the first application interface supports always-on display.

In some embodiments, the method further includes:

entering, by the first system, a screen-off state, in a case where the device state meets the always-on display condition and the first application interface does not support always-on display.

In some embodiments, the sending, by the first system, a state entry command to the second system includes:

sending, by the first system, the state entry command to the second system, in a case where a duration of entering the always-on display state reaches a duration threshold.

Figure 6:
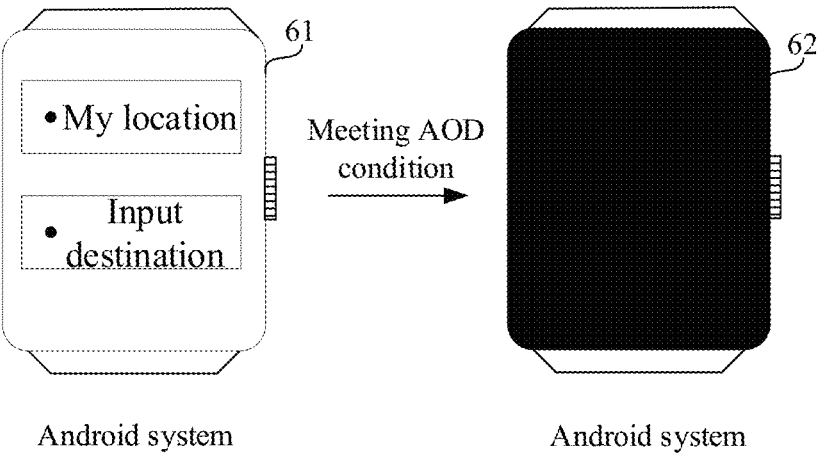
FIG. 6 is a schematic diagram of an electronic device performing an always-on display according to other embodiments of the present disclosure.

In a possible implementation, since the first application interface of the first application may support or not support the always-on display, the first system enters the screen-off state when the device state meets the always-on display condition and the first application interface does not support the always-on display. For illustrative purposes, as shown in FIG. 6, taking the wearable device being a smartwatch as an example, the smartwatch is arranged with an Android system (run by the first processor) and an RTOS (run by the second processor). Taking the first application as an example of a navigation application, when the first application interface is a route input interface 61, the route input interface 61 does not support the always-on display since the route input interface 61 requires the smartwatch to be in the screen-on state for location input operations. In this case, when the device state of the smartwatch meets the always-on display condition, the Android system enters the dormant state and displays an always-on display interface 62.

Since there may be a situation where the second system is not installed with any second application that supports the always-on display state transition with the first application, the second system needs to determine whether a second application that supports the always-on display state transition is installed after receiving the state entry command.

In a possible implementation, the state entry command sent by the first system to the second system for indicating the second system to enter the always-on display state includes an application identifier of the first application. After the second system obtains the state entry command, when the second system is identified to be installed with the second application based on the application identifier of the first application, the second application interface of the second application is displayed in the always-on display state.

Referring to FIG. 7, FIG. 7 is a flowchart of an always-on display method according to other embodiments of the present disclosure. The embodiments are described and illustrated by taking an example where the method is applied to an electronic device and the electronic device supports running a first system and a second system (the operating power consumption of the first system is higher than that of the second system). The method may include operations at blocks illustrated herein.

At block 701: displaying, by the first system, a first application interface of a first application in an always-on display (AOD) state; where the first application is an application installed in the first system.

The implementation of this step can refer to step 401, which will not be further described herein.

At block 702: sending, by the first system, a state entry command to the second system; where the state entry command is configured to instruct the second system to enter the always-on display state.

The implementation of this step can refer to step 402, which will not be further described herein.

At block 703: determining, by the second system, a second application that matches the first application according to the application identifier of the first application, in a case where a white list is identified to contain the application identifier of the first application; and/or.

In a possible implementation, the electronic device stores a whitelist in a data storage area corresponding to the second system, and the whitelist contains an application identifier of at least one application that supports always-on display state transition. After the second system obtains the state entry command, the second system obtains the application identifier of the first application contained in the state entry command through the AOD service, and then the second system determines that the second application is installed through the AOD service when identifying that the application identifier is contained in the whitelist.

In some embodiments, the whitelist contains an application identifier of an application in the first system that has the AOD function and an application identifier of an application in the second system that supports always-on display state transition.

In some embodiments, the whitelist obtains application identifiers of applications based on historical AOD records. The historical AOD records are stored in a corresponding storage space of the second system. After each always-on display state transition between the first system and the second system, the second system updates historical always-on display state transition records stored in the storage space.

In some embodiments, after the second system obtains the application identifier of the first application in the state entry command, the second system queries the whitelist based on the application identifier of the first application. When the application identifier is contained in the whitelist, the second system determines that the first application is an application in the second system that supports always-on display state transition, and the second system then determines the second application corresponding to the first application from the second system through the AOD service. The first application and the second application support always-on display state transition between each other.

In a schematic example, the contents of the whitelist and the correspondence between the frequently-used applications and the second application are shown in Tables 1 and 2.

TABLE 1

| Whitelist |
| --- |
| Frequently-used application identifier A |
| Frequently-used application identifier B |
| Frequently-used application identifier C |
| Frequently-used application identifier D |

TABLE 2

| Frequently-used application | Second application |
| --- | --- |
| Frequently-used application A | Second application a |
| Frequently-used application B | Second application b |
| Frequently-used application C | Second application c |
| Frequently-used application D | Second application d |

For illustrative purposes, when the state entry command obtained by the second system contains the application identifier A of the first application A, the first system queries the whitelist based on the application identifier A. When the whitelist is queried to contain the application identifier A, the second system determines that the first application A is the frequently-used application A, and then determines the second application a corresponding to the first application A from the second system based on the correspondence shown in Table 2.

In some embodiments, the matching relationship between the frequently-used application and the second application is stored in the corresponding storage space of the second system, and is maintained and updated by the second system. In some embodiments, the application identifier in the whitelist may include an application icon, application name, application package name, etc., which is not limited herein.

At block 704: obtaining, by the second system, an application list, in a case where the whitelist is identified not to contain the application identifier of the first application; where the application list contains an application identifier of an application installed in the second system.

In a possible implementation, after identifying that the application identifier of the first application is not contained in the whitelist, the second system obtains the application list through the AOD service and identifies the application identifiers in the application list.

Since the whitelist only contains application identifiers of frequently-used applications in the first system that have AOD function, with which the second system has applications that support always-on display state transition, and there is a situation where the first application included in the state entry command is not a frequently-used application, in order to ensure comprehensive identification, in a possible implementation, the second system stores in advance the application identifiers of applications installed in the second system that support AOD function in the application list through the AOD service.

In some embodiments, the application identifier in the application list may include an application icon, application name, application package name, etc., which is not limited herein.

In some embodiments, the application identifier in the application list is stored in the corresponding storage space of the second system and is maintained and updated by the second system.

In some embodiments, whenever the second system installs and/or uninstalls a new application, the second system updates the application identifier of the installed application stored in the application list.

At block 705: determining, by the second system, the second application that matches the first application according to the application identifier of the first application, in a case where the application list contains an application identifier that matches the application identifier of the first application; where the application identifier of the second application matches the application identifier of the first application.

In a possible implementation, after the second system obtains the application identifier of the first application in the state entry command, it matches the application identifier of the first application with the application identifiers of each of the second applications in the application list and compares the matching degree between the application identifier of the first application and the application identifiers of each of the second applications. When the matching degree is higher than a matching threshold, the second system determines that there is a second application that matches the first application, and takes an application with the highest matching degree as the second application.

In a schematic example, the contents in the application list are shown in Table 3.

TABLE 3

| Application list |
| --- |
| Application identifier a |
| Application identifier b |
| Application identifier c |
| Application identifier d |

Schematically, after the second system obtains the application identifier A of the first application A in the state entry command, it matches the application identifier A with the application identifiers a, b, c, and d. When the matching degree between application identifier A and application identifier a is 0.85, the matching degree between application identifier A and application identifier b is 0.05, the matching degree between application identifier A and application identifier c is 0.16, and the matching degree between application identifier A and application identifier d is 0.31, the second system determines that the matching degree between application identifier A and application identifier a is the highest. When the matching threshold is 0.8, since 0.85 is greater than 0.8, that is, the matching degree between the application identifier A of the first application A and the application identifier a is higher than the matching threshold, the second system determines that there is a second application that matches the first application A, and the second application a corresponding to the application identifier a with the highest matching degree is determined to be the second application that matches the first application.

In another possible implementation, the second system has a pre-stored matching relationship between the application identifier of the first application and the application identifier of the second application. After the second system obtains the application identifier of the first application contained in the state entry command through the AOD service, it determines the application identifier of the second application that matches the application identifier of the first application based on the matching relationship, and then identifies whether the application identifier of the second application is included in the application list, that is, whether the application identifier of the second application is included in the application identifier of the application that has been installed in the application list and supports the AOD function.

Further, in a case where the application list contains the application identifier of the second application that matches the application identifier of the first application, the second system determines that the second application is installed.

In another illustrative example, the matching relationship between the application identifier of the first application and the application identifier of the second application is shown in Table 4.

TABLE 4

| Application identifier of the first application | Application identifier of the second application |
| --- | --- |
| Application identifier A | Application identifier a |
| Application identifier B | Application identifier b |
| Application identifier C | Application identifier c |
| Application identifier D | Application identifier d |

Schematically, after the second system obtains the application identifier A of the first application A in the state entry command, the AOD service of the second system determines that the application identifier corresponding to the application identifier A is application identifier a based on the correspondence relationship shown in Table 4. The second system then identifies whether the application identifier a is included in the application identifiers of the installed applications in the application list. After the AOD service of the second system identifies that the application list includes the application identifier a, the second system determines that the second system has installed an application corresponding to application identifier a, and this application is the second application.

At block 706: sending, by the second system, an acceptance response command to the first system, in a case where the second application is identified to be installed based on the application identifier of the first application.

Further, in a case where the second application is identified to be installed based on the application identifier of the first application, the second system sends the acceptance response command to the first system via the AOD service. The acceptance response command is configured to inform the first system that the second system is in a wake-up state and that the second system has been confirmed to install the second application.

In some embodiments, the second system starts the second application at the same time as it sends the acceptance response command to the first system, such that the second application interface can be drawn subsequently via the second application.

At block 707: sending, by the first system, a state synchronization message to the second system, in a case where the acceptance response command is received; where the state synchronization message is configured to synchronize the always-on display states of the first application and the second application.

In a possible implementation, after the first system receives the acceptance response command, it is confirmed that the second system is in the wake-up state and that the second system has the second application installed, and then the first system sends the state synchronization message to the second system.

In some embodiments, the first system sends the state synchronization message to the second system by means of dual-core communication. The state synchronization message may include display content synchronization information, image display color parameter information, image display position information, etc., which is not limited herein.

At block 708: drawing, by the second system, the second application interface through the second application, and displaying, by the second system, the second application interface in the always-on display state based on the state synchronization message.

In a possible implementation, the second system draws the second application interface through the second application and displays the second application interface in the always-on display state based on the state synchronization message.

In some embodiments, based on the state synchronization message, the second system draws the second application interface through the second application, and the image display content and image display parameters such as font, font size, application icon size, and application icon view are the same as those of the first application interface of the first application.

In the embodiments of the present disclosure, after the second system obtains the state entry command, and in a case where the application identifier of the first application is identified to be contained in the whitelist, it is determined that the second application is installed, and the second application interface of the second application is displayed in the always-on display state, which helps ensure that the second system includes the second application corresponding to the first application.

At block 709: entering, by the first system, a dormant state.

The implementation of this step can refer to step 404, which will not be further described herein.

In the embodiments, after the second system obtains the application identifier A of the first application A in the state entry command, it performs step-by-step identification of the whitelist and the application list. The whitelist contains a small number of application identifiers, but the identification speed is relatively fast, while the application list contains a large number of application identifiers, which can ensure comprehensive identification. In this way, the efficiency and comprehensiveness of the second system determining the second application may be ensured, thereby ensuring as far as possible that the second application interface corresponding to the first application interface of the first application is displayed by the second system with low power consumption in the always-on display state, and thus achieving the purpose of reducing power consumption.

Since there is a situation where the AOD service of the second system determines that no second application is installed on the second system based on the whitelist and the application list, in a possible implementation, in a case where the second application is identified not to be installed based on the application identifier of the first application, the second system sends a rejection response command to the first system to inform the first system that the second application is not installed on the second system and that the second application interface of the second application cannot be displayed in the always-on display state.

Further, in a case where the rejection response command is received, the first system continues to display the first application interface of the first application in the always-on display state.

In the embodiments of the present disclosure, the second system sends a rejection response command to the first system to inform the first system that the second application is not installed in the second system and that the second application interface of the second application cannot be displayed in the always-on display state, such that the first system continues to display the first application interface of the first application in the always-on display state. This may reduce the operating power consumption of the second system and avoid an unresponsive situation in which the first system sends the state entry command to the second system and the second system cannot display the second application interface of the second application in the always-on display state.

In the above embodiments, the state entry command sent by the first system to the second system for instructing the second system to enter the always-on display state includes the application identifier of the first application. After the second system obtains the state entry command, it determines whether the second system is installed with a second application that supports the always-on display state transition based on the application identifier of the first application.

In another possible implementation, the first system directly determines whether a second application that supports the always-on display state transition is installed in the second system through a state transition table. In a case where it is determined that the second application is installed in the second system, the first system sends the state entry command to the second system that instructs the second system to enter the always-on display state, and the second system obtains the state entry command and displays the second application interface of the second application in the always-on display state based on the application identifier of the second application.

Figure 8:
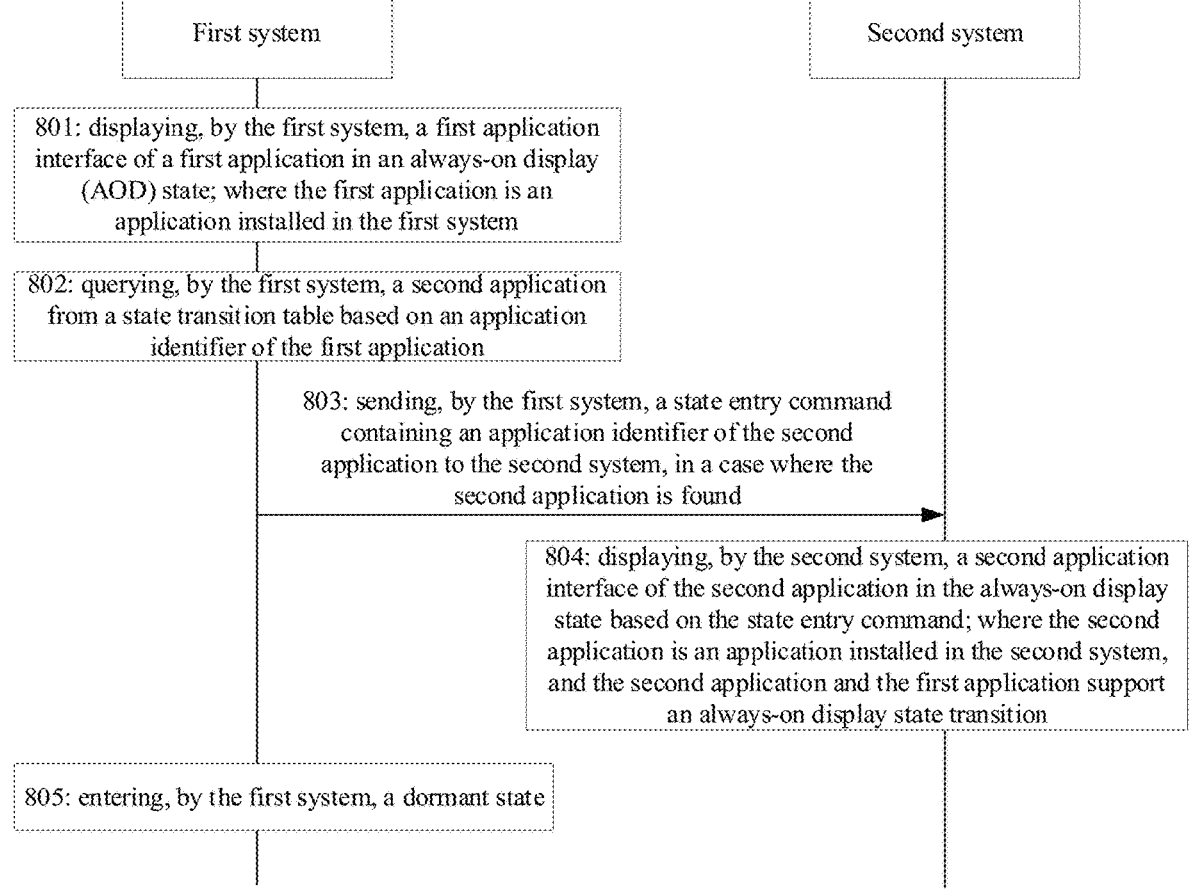
FIG. 8 is a flowchart of an always-on display method according to further other embodiments of the present disclosure.

Referring to FIG. 8, FIG. 8 is a flowchart of an always-on display method according to further other embodiments of the present disclosure. The embodiments are described and illustrated by taking an example where the method is applied to an electronic device and the electronic device supports running a first system and a second system (the operating power consumption of the first system is higher than that of the second system). The method may include operations at blocks illustrated herein.

At block 801: displaying, by the first system, a first application interface of a first application in an always-on display (AOD) state; where the first application is an application installed in the first system.

The implementation of this step can refer to step 401, which will not be further described herein.

At block 802: querying, by the first system, a second application from a state transition table based on an application identifier of the first application.

In a possible implementation, the first system displays the first application interface of the first application in the always-on display state through the AOD service, and then queries the second application from the state transition table based on the application identifier of the first application. The state transition table includes a correspondence between applications that support always-on display state transition in the first system and the second system, and the state transition table is generated based on the installed applications of the first system and the installed applications of the second system.

In some embodiments, the state transition table may include a correspondence between an installed application in the first system and an installed application in the second system, or a correspondence between an application identifier of an installed application in the first system and an application identifier of an installed application in the second system.

In some embodiments, the correspondence in the state transition table is stored in a corresponding storage space of the first system and is maintained and updated by the first system.

In some embodiments, whenever the second system installs and/or uninstalls a new application, the second system sends an application update message to the first system via dual-core communication to instruct the first system to update the correspondence stored in the state transition table based on the application update message.

In a schematic example, the state transition table contains the correspondence between the installed applications in the first system and the installed applications in the second system as shown in Table 5.

TABLE 5

| Installed applications in the first system | Installed applications in the second system |
|---|---|
| Application A | Application a |
| Application B | Application b |

TABLE 5-continued

| Installed applications in the first system | Installed applications in the second system |
|---|---|
| Application C | Application c |
| Application D | Application d |

For example, after the first system displays the first application interface of the first application in the first system in the always-on display state through the AOD service, when the first application is application A, the first system queries the state transition table through the AOD service to check whether the second system contains the installed application corresponding to application A. The first system finds that the second system is installed with an application a that corresponds to the application A. Therefore, the first system queries via the AOD service to find out that application a is the second application. When the first application is application E, the first system inquires whether the second system contains an installed second application corresponding to application E by means of the AOD service querying the state transition table, and the first system finds out that no application matching application E is installed in the second system, and therefore the first system determines that it has not inquired about the second application by means of the AOD service.

In some embodiments, in a case where the second application is not found, the first system continues to display the first application interface of the first application in the always-on display state.

At block 803: sending, by the first system, a state entry command containing an application identifier of the second application to the second system, in a case where the second application is found.

Further, after the first system has found the second application in the state transition table via the AOD service, the first system sends the state entry command to the second system containing the application identifier of the second application.

In some embodiments, the state entry command sent by the first system to the second system further includes a state synchronization message, which is configured to synchronize the always-on display states of the first application and the second application.

In some embodiments, the first system sends the state synchronization message to the second system via dual-core communication. The state synchronization message may include display content synchronization information, image display color parameter information, image display position information, etc., which is not limited herein.

In a possible implementation, the first system directly sends the state entry command to the second system to instruct the second system to enter the always-on display state; or, when a duration of the first system entering the always-on display state reaches a duration threshold, the first system sends the state entry command to the second system to instruct the second system to enter the always-on display state.

At block 804: displaying, by the second system, a second application interface of the second application in the always-on display state based on the state entry command; where the second application is an application installed in the second system, and the second application and the first application support an always-on display state transition.

In a possible implementation, the second system is woken up and runs in the background. After receiving the state entry command sent by the first system, the second system displays the second application interface of the second application in the always-on display state through the AOD service based on the state entry command.

In some embodiments, the second application and the first application are applications with the same function installed separately on the second system and the first system; or, the second application and the first application are the same application installed separately in the second system and the first system.

In some embodiments, the second application and the first application can realize the always-on display state transition through dual-core communication, such that the second application interface of the second application displayed by the second system based on the state entry command in the always-on display state is the same as the first application interface of the first application displayed by the first system.

In some embodiments, since the state entry command obtained by the second system includes the application identifier of the second application, the AOD service of the second system starts the second application based on the application identifier of the second application, and then draws the second application interface through the second application and displays the second application interface in the always-on display state based on the state synchronization message.

At block 805: entering, by the first system, a dormant state.

The implementation of this step can refer to step 404, which will not be further described herein.

In the embodiments, the first system directly determines whether the second system has a second application installed that supports always-on display state transition by a state transition table. When it is determined that the second system has the second application installed, the first system directly sends a state entry command to the second system that includes an application identifier of the second application. This can reduce unnecessary dual-core communication between the first system and the second system in a case where the second system does not have the second application installed that supports always-on display state transition, and further reduce energy consumption. Moreover, since the performance of the first system is higher than that of the second system, determining whether the second application is installed in the second system by the first system may reduce the calculation time and facilitate a faster response to user needs.

In a possible implementation, the operating modes of the electronic device include a performance mode, a hybrid mode, and a low-power mode. In the performance mode, both the second processor and the first processor remain awake (and, accordingly, both the first system and the second system are in the wake-up state). In the hybrid mode, the second processor is in standby mode and can switch between the dormant and wake-up states while events are being processed by the first system (i.e., while the first system is in the wake-up state, the second system can be in either the wake-up state or the dormant state). In the low-power mode, only the second processor remains in the wake-up state while the first processor remains switched off (i.e. the second system is in the wake-up state and the first system is in the off state). The names of the operating modes of the electronic device described above are used for illustrative purposes only and do not constitute a limitation on the content of the operating modes.

In a possible implementation, when the electronic device is in the performance mode, the solutions provided in the above embodiments are applied to implement an always-on display. The operating modes of the electronic device include, in addition to the performance mode, the hybrid mode and the low-power mode.

In the hybrid mode, the first system is in the wake-up state while the second system is in the dormant state; or, the first system is in the wake-up state while the second system is also in the wake-up state, and the first system is in a foreground operating state while the second system is in a background operating state.

In some embodiments, in a case where the first system is in the wake-up state and the second system is in the dormant state, after the first system displays the first application interface of the first application in the always-on display state via the AOD service, in order to reduce the power consumption required for the device to implement the AOD function, the first system is required to wake up the second system, which is in the dormant state, such that the AOD function can be implemented via the second system.

In some embodiments, the first system wakes up the second system by means of dual-core communication, or the first system wakes up the second system by sending an interrupt, which is not limited herein.

In some embodiments, after being woken up, the second system sends a feedback notification to the first system. After receiving the feedback notification sent by the second system, the first system confirms that the second system has switched from the dormant state to the wake-up state, and then sends the state entry command to the second system to instruct the second system to enter the always-on display state.

In addition, in the low-power mode, only the second system is in the wake-up state and the first system is in the off state. Since the first system is always turned off in the low-power mode, the electronic device can only display the second application interface of the second application in the always-on display state through the second system. However, since the performance of the second system is inferior to that of the first system, there is a situation where the second system does not have the second application installed. Even though the operating power consumption of the electronic device in the low-power mode is low, the user's always-on display needs cannot be met only through the always-on display function of the second system.

Figure 9:
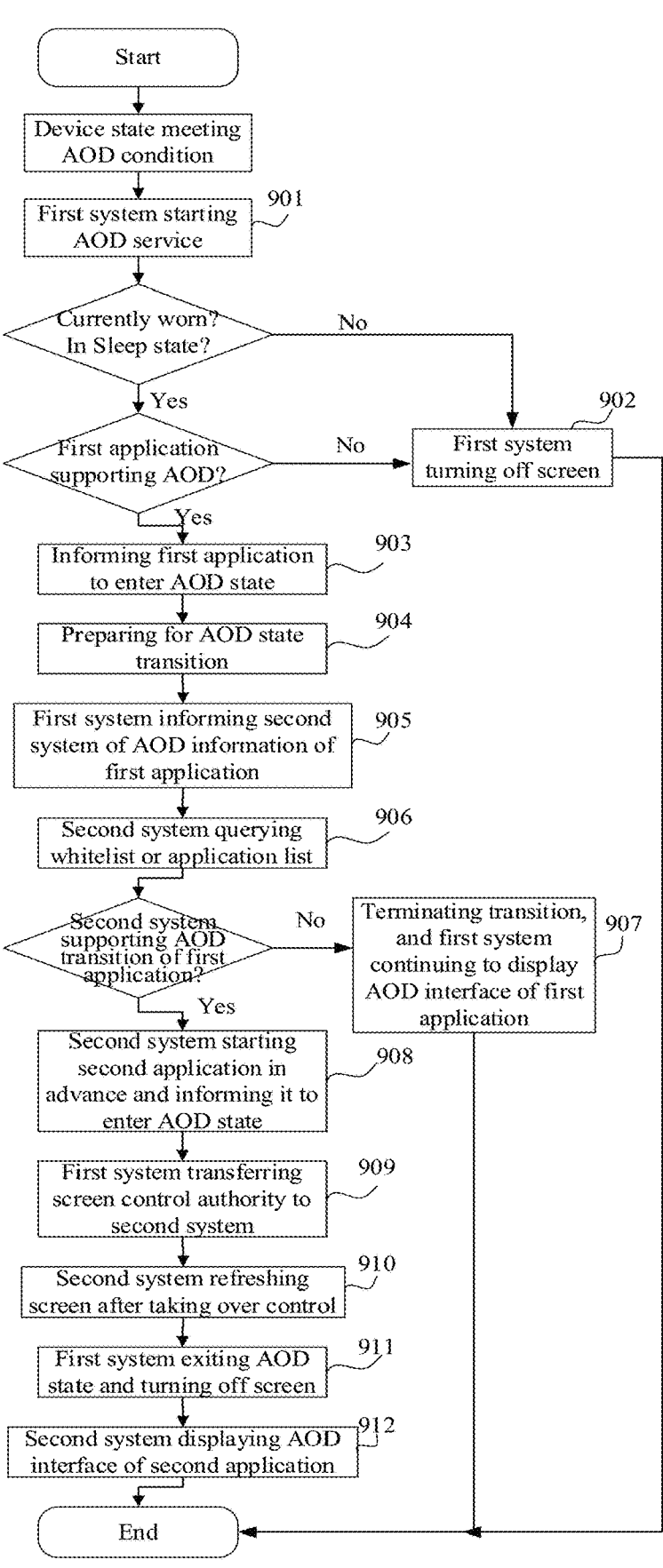
FIG. 9 is a flowchart of an always-on display method according to still other embodiments of the present disclosure.

Combining the above embodiments, FIG. 9 is a flowchart of an always-on display method according to still other embodiments of the present disclosure. The method includes operations at blocks illustrated herein.

At block 901: starting, by the first system, the AOD service, in a case where the device state meets a screen display condition.

At block 902: entering, by the first system, a screen-off state, in a case where the first system determines, via the AOD service, that the electronic device is in a non-worn state, or, that the operating state of the electronic device is a dormant state, or, that the first application is an application that cannot support the AOD function.

At block 903: informing, by the first system, the first application to enter the AOD state, in a case where the first system determines, via the AOD service, that the electronic device is in a worn state, that the working state of the electronic device is not the dormant state, and that the first application is an application that can support the AOD function.

At block 904: displaying, by the first system, an AOD interface of the first application in the AOD state, obtaining AOD information of the first application based on the AOD interface of the first application, and preparing for the always-on display state transition;

At block 905: sending, by the first system, a state entry command to the second system; where the state entry command is configured to instruct the second system to enter the always-on display state; the state entry command includes the AOD information of the first application required by the second system for always-on display; the AOD information of the first application may be an application identifier of the first application, or an application identifier of the second application that matches the first application.

At block 906: searching, by the second system, a whitelist or an application list to confirm whether a second application that can support the always-on display state transition with the first application is installed in the second system.

At block 907: in a case where the second system identifies that no second application that can support the always-on display state transition with the first application is installed, sending, by the second system, a command rejection response to the first system; after receiving the command rejection response, continuing, by the first system, to display the AOD interface of the first application in the always-on display state.

At block 908: in a case where the second system identifies that a second application that can support the always-on display state transition with the first application is installed, starting, by the second system, the second application in advance and notifying the second application to enter the always-on display state.

At block 909: transferring, by the first system, the screen control authority to the second system.

At block 910: after obtaining the screen control authority, performing, by the second system, a screen refresh operation.

At block 911: exiting, by the first system, the always-on display state and turning off the screen to enter the dormant state.

At block 912: displaying, by the second system, the AOD interface of the second application via the screen in the always-on display state; where the AOD interface of the first application is the same as the AOD interface of the second application.

Figure 10:
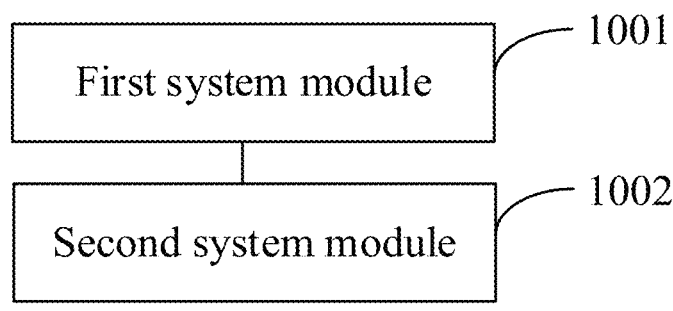
FIG. 10 is a block diagram of an always-on display apparatus according to some embodiments of the present disclosure.

Referring to FIG. 10, FIG. 10 is a block diagram of an always-on display apparatus according to some embodiments of the present disclosure. The apparatus can be implemented as all or part of an electronic device by software, hardware, or a combination thereof. The device includes:

a first system module 1001, configured to display a first application interface of a first application in an always-on display state; where the first application is an application installed in the first system module 1001;

where the first system module 1001 is further configured to send a state entry command to a second system module 1002, the state entry command being configured to instruct the second system module 1002 to enter the always-on display state; and the second system module 1002, configured to display a second application interface of the second application in the always-on display state based on the state entry command; where the second application is an application installed in the second system module 1002, and the second application and the first application support an always-on display state transition;

where the first system module 1001 is further configured to enter a dormant state.

In some embodiments, the state entry command includes an application identifier of the first application;

the second system module 1002 is further configured to:

display the second application interface of the second application in the always-on display state, in a case where the second application is identified based on the application identifier of the first application.

In some embodiments, the electronic device stores a whitelist including an application identifier of at least one frequently-used application supporting the always-on display state transition;

the second system module 1002 is further configured to:

determine the second application matching the first application based on the application identifier of the first application, in a case where the application identifier of the first application is identified in the whitelist; and/or obtain the application list including application identifiers of applications installed in the second system module 1002, in a case where an application identifier of the first application is not identified in the whitelist;

determine the second application matching the first application based on the application identifier of the first application, in a case where the application list includes an application identifier matching the application identifier of the first application; where the application identifier of the second application matches the application identifier of the first application.

In some embodiments, the second system module 1002 is further configured to:

send an acceptance response command to the first system module 1001, in a case where the second application is identified as being installed based on the application identifier of the first application;

the first system module 1001 is further configured to:

send a state synchronization message to the second system module 1002, in a case where the acceptance response command is received; where the state synchronization message is configured to synchronize the always-on display states of the first application and the second application;

the second system module 1002 is further configured to:

draw the second application interface via the second application and display the second application interface in the always-on display state based on the state synchronization message.

In some embodiments, the second system module 1002 is further configured to:

send a rejection response command to the first system module 1001, in a case where the second application is not installed based on the application identification of the first application;

the first system module 1001 is further configured to:

continue to display the first application interface of the first application in the always-on display state, in a case where the rejection response command is received.

In some embodiments, the state transition instruction includes an application identifier of the second application;

the second system module 1002 is further configured to:

display the second application interface of the second application in the always-on display state based on the application identifier of the second application.

In some embodiments, the first system module 1001 is further configured to:

query the second application from a state transition table based on the application identifier of the first application; where the state transition table includes a correspondence between applications that support always-on display state transition in the first system module 1001 and the second system module 1002, and the state transition table is generated based on the installed applications of the first system module 1001 and the installed applications of the second system module 1002;

send the state entry command to the second system module 1002 that includes an application identifier of the second application, in a case where the second application is found.

In some embodiments, the first system module 1001 is further configured to:

continue to display the first application interface of the first application in the always-on display state, in a case where the second application is not found.

In some embodiments, the state entry command includes a state synchronization message, which is configured to synchronize the states of the first application and the second application;

the second system module 1002 is further configured to:

start the second application based on the application identifier of the second application;

draw the second application interface through the second application and display the second application interface in the always-on display state based on the state synchronization message.

In some embodiments, the first system module 1001 is further configured to:

transfer a screen control authority to the second system module 1002.

In some embodiments, the first system module 1001 is further configured to:

display the first application interface of the first application in a screen-on display state;

display the first application interface of the first application in the always-on display state, in a case where the device state meets the always-on display condition and the first application interface supports always-on display.

In some embodiments, the first system module 1001 is further configured to:

enter a screen-off state, in a case where the device state meets the always-on display condition and the first application interface does not support always-on display.

In some embodiments, the first system module 1001 is further configured to:

send the state entry command to the second system, in a case where a duration of entering the always-on display state reaches a duration threshold.

In summary, in the embodiments of the present disclosure, for an electronic device supporting dual-system, in the presence of a need for an always-on display, the high-power-consumption first system first displays the first application interface of the first application in the always-on display state, and sends a state entry command to the low-power-consumption second system to instruct the second system to enter the always-on display state, such that after the second system displays the second application interface of the second application in the always-on display state, the first system enters the dormant state. While ensuring the normal operation of the AOD function of the electronic device, it may avoid the problem of high-power consumption of the electronic device caused by the high-performance system needing to remain in operation for a long time when implementing the AOD function, which helps reduce the power consumption of the electronic device and improve the battery life of the electronic device.

Figure 11:
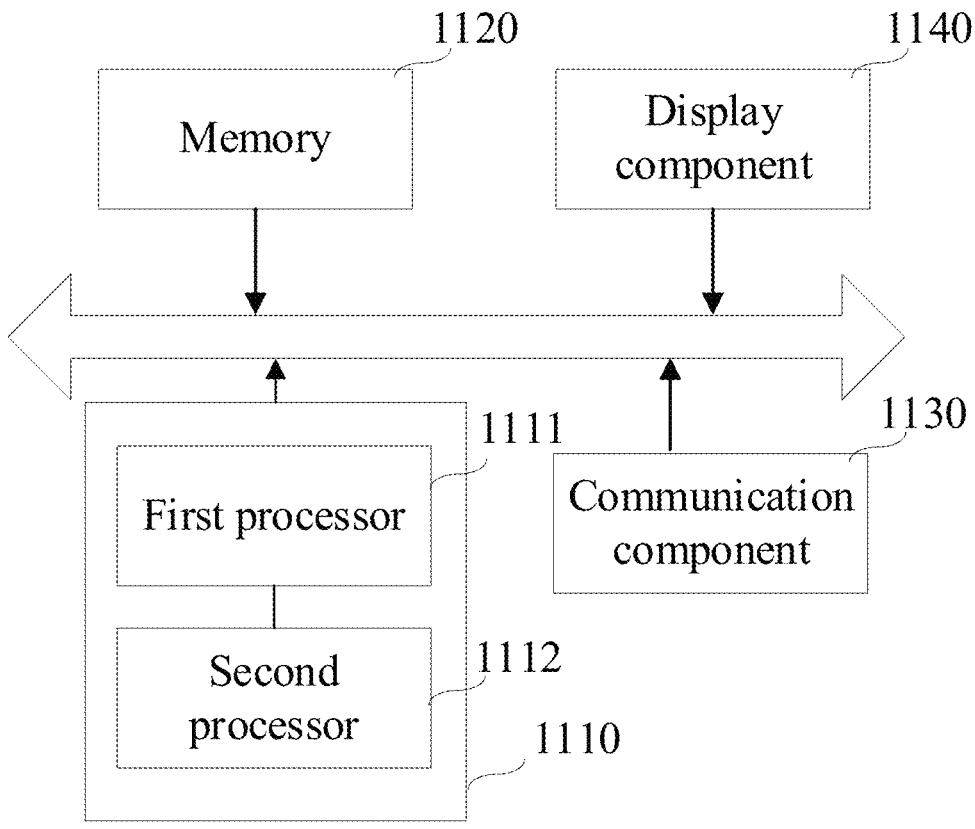
FIG. 11 is a block diagram of an electronic device according to some embodiments of the present disclosure.

Referring to FIG. 11, FIG. 11 is a block diagram of an electronic device according to some embodiments of the present disclosure. The electronic device of the present disclosure may include one or more of the following components: a processor 1110 and memory 1120.

In some embodiments, the processor 1110 includes at least a first processor 1111 and a second processor 1112, where first processor 1111 is configured to run a first system and second processor 1112 is configured to run a second system, and the power consumption of the first processor 1111 is lower than the power consumption of the second processor 1112 and the performance of the first processor 1111 is lower than the performance of the second processor 1112. The processor 1110 uses various interfaces and lines to connect various parts within the entire electronic device, and executes various functions of the electronic device and processes data by running or executing instructions, programs, code sets or instruction sets stored in the memory 1120 and calling data stored in the memory 1120. In some embodiments, the processor 1110 may be implemented in at least one of the hardware forms of Digital Signal Processing (DSP), Field-Programmable Gate Array (FPGA), and Programmable Logic Array (PLA). The processor 1110 may integrate one or a combination of a central processing unit (CPU), graphics processing unit (GPU), neural network processing unit (NPU), and modem. The CPU mainly processes the operating system, user interface and applications, etc.; the GPU is configured to render and draw the content to be displayed on the touch display; the NPU is configured to implement artificial intelligence (AI) functions; and the modem is configured to process wireless communication. It is understood that the modem may not be integrated into the processor 1110, and may be implemented separately by a chip.

The memory 1120 may include random access memory (RAM) and/or read-only memory (ROM). In some embodiments, the memory 1120 includes a non-transitory computer-readable storage medium. The memory 1120 may be configured to store instructions, programs, code, code sets or sets of instructions. The memory 1120 may include a storage program area and a storage data area, where the storage program area may store instructions for implementing an operating system, instructions for at least one function (e.g., touch function, sound playback function, image playback function, etc.), instructions for implementing each of the method embodiments, etc.; and the storage data area may store data created based on the use of the wearable device (e.g., audio data, phonebook, etc.).

The electronic device of the present disclosure further includes a communication component 1130 and a display component 1140. The communication component 1130 may be a Bluetooth component, a Wireless Fidelity (Wi-Fi) component, a Near Field Communication (NFC) component, etc., which is configured to communicate with external devices (servers or other terminal devices) via wired or wireless networks; the display component 1140 is configured to display a graphical user interface, and/or, to receive user interaction.

In addition, it is understood by those skilled in the art that the structure of the electronic device shown in the above drawings does not constitute a limitation on the electronic device, and that the electronic device may include more or fewer components than those shown, or a combination of some components, or a different arrangement of components. For example, the electronic device further includes components such as radio frequency circuits, input units, sensors, audio circuits, speakers, microphones, and power supplies, which will not be described in detail herein.

The embodiments of the present disclosure further provide a computer-readable storage medium storing at least one program, and the at least one program is configured to be executed by a processor to realize the always-on display method as described in the above embodiments.

The embodiments of the present disclosure further provide a computer program product, which includes computer instructions stored in a computer-readable storage medium. The processor of the electronic device reads the computer instructions from the computer-readable storage medium, and the processor executes the computer instructions, such that the electronic device executes the always-on display method as described in the above embodiments.

Those skilled in the art should be aware that the functions described in the embodiments of the present disclosure may be implemented in hardware, software, firmware, or any combination thereof, in one or more of the above examples. When implemented using software, these functions can be stored on a computer-readable medium or transmitted as one or more instructions or codes on a computer-readable medium. The computer-readable medium includes a computer storage medium and a communication medium, where the communication medium includes any media that facilitates the transfer of a computer program from one place to another, and the storage medium can be any available media that can be accessed by general-purpose or special-purpose computers.

The above is only some embodiments of the present disclosure and is not intended to limit the present disclosure. Any modifications, equivalent replacements, improvements, etc., made within the spirit and principles of the present disclosure shall be included in the scope of the present disclosure.

The invention claimed is:

1. An always-on display method, performed by an electronic device; wherein the electronic device supports running a first system and a second system, and an operating power consumption of the first system is higher than an operating power consumption of the second system;

wherein the method comprises:

displaying, by the first system, a first application interface of a first application in an always-on display state; wherein the first application is an application installed in the first system;

sending, by the first system, a state entry command to the second system; wherein the state entry command is configured to instruct the second system to enter the always-on display state;

displaying, by the second system, a second application interface of a second application in the always-on display state based on the state entry command; wherein the second application is an application installed in the second system, and the second application and the first application support an always-on display state transition; and entering, by the first system, a dormant state;

wherein before the displaying, by the second system, the second application interface of the second application in the always-on display state, the method further comprises:

transferring, by the first system, a screen control authority to the second system.

2. The method according to claim 1, wherein a case 1 or a case 2 is satisfied:

in the case 1, the state entry command comprises an application identifier of the first application; the displaying, by the second system, a second application interface of a second application in the always-on display state based on the state entry command comprises:

displaying, by the second system, the second application interface of the second application in the always-on display state, in a case where it is identified based on the application identifier of the first application that the second application is installed;

in the case 2, the state entry command comprises an application identifier of the second application; the displaying, by the second system, a second application interface of a second application in the always-on display state based on the state entry command comprises:

displaying, by the second system, the second application interface of the second application in the always-on display state based on the application identifier of the second application.

3. The method according to claim 2, wherein in the case 1, the electronic device stores a whitelist, and the whitelist contains an application identifier of at least one frequently-used application that supports the always-on display state transition;

before the displaying, by the second system, the second application interface of the second application in the always-on display state in a case where it is identified based on the application identifier of the first application that the second application is installed, the method further comprises at least one of:

operation 1: determining, by the second system, the second application that matches the first application according to the application identifier of the first application, in a case where the white list is identified to contain the application identifier of the first application; and operation 2: obtaining, by the second system, an application list, in a case where the white list is identified not to contain the application identifier of the first application; wherein the application list contains application identifiers of applications installed in the second system; and determining, by the second system, the second application that matches the first application according to the application identifier of the first application, in a case where the application list contains an application identifier that matches the application identifier of the first application; wherein an application identifier of the second application matches the application identifier of the first application.

4. The method according to claim 2, wherein in the case 1, at least one of a case 3 and a case 4 is satisfied;

in the case 3, the method further comprises:

sending, by the second system, an acceptance response command to the first system, in a case where it is identified based on the application identifier of the first application that the second application is installed; and sending, by the first system, a state synchronization message to the second system, in a case where the acceptance response command is received; wherein the state synchronization message is configured to synchronize the always-on display states of the first application and the second application;

wherein the displaying, by the second system, the second application interface of the second application in the always-on display state comprises:

drawing, by the second system, the second application interface through the second application, and displaying, by the second system, the second application interface in the always-on display state based on the state synchronization message;

in the case 4, the method further comprises:

sending, by the second system, a rejection response command to the first system, in a case where it is identified based on the application identifier of the first application that the second application is not installed; and continuing, by the first system, to display the first application interface of the first application in the always-on display state, in a case where the rejection response command is received.

5. The method according to claim 2, wherein in the case 2, the sending, by the first system, a state entry command to the second system comprises:

querying, by the first system, the second application based on the application identifier of the first application from a state transition table; wherein the state transition table contains a correspondence between applications supporting the always-on display state transition in the first system and the second system, and the state transition table is generated based on applications installed in the first system and applications installed in the second system;

continuing, by the first system, to display the first application interface of the first application in the always-on display state, in a case where the second application is not found; and sending, by the first system, the state entry command that contains the application identifier of the second application to the second system, in a case where the second application is found.

6. The method according to claim 2, wherein in the case 2, the state entry command contains a state synchronization message configured to synchronize the always-on display states of the first application and the second application;

the displaying, by the second system, the second application interface of the second application in the always-on display state based on the application identifier of the second application comprises:

starting, by the second system, the second application based on the application identifier of the second application; and drawing, by the second system, the second application interface through the second application, and displaying, by the second system, the second application interface in the always-on display state based on the state synchronization message.

7. The method according to claim 1, before the displaying, by the first system, the first application interface of the first application in the always-on display state, further comprising:

displaying, by the first system, the first application interface of the first application in a screen-on display state;

wherein the displaying, by the first system, the first application interface of the first application in the always-on display state comprises:

displaying, by the first system, the first application interface of the first application in the always-on display state, in a case where a device state meets an always-on display condition and the first application interface supports always-on display.

8. The method according to claim 7, further comprising: entering, by the first system, a screen-off state, in a case where the device state meets the always-on display condition and the first application interface does not support the always-on display.

9. The method according to claim 7, further comprising: exiting, by the first system, the always-on display state, and entering, by the first system, a screen-off state.

10. The method according to claim 1, wherein the sending, by the first system, a state entry command to the second system comprises:

sending, by the first system, the state entry command to the second system, in a case where a duration of entering the always-on display state reaches a duration threshold.

11. The method according to claim 1, wherein the second application and the first application are applications with a same function installed separately in the second system and the first system; or, the second application and the first application are a same application installed separately in the second system and the first system; or, the second application and the first application are applications with a same application interface installed separately in the second system and the first system.

12. The method according to claim 1, wherein the displaying, by the second system, a second application interface of a second application in the always-on display state based on the state entry command comprises:

after the second system obtains the state entry command, starting, by the second system, the second application, and displaying, by the second system, the second application interface of the second application which is the same as the first application interface of the first application.

13. The method according to claim 1, before the displaying, by the second system, a second application interface of a second application in the always-on display state based on the state entry command, further comprising:

in a case where the second system identifies that the second application that supports the always-on display state transition with the first application is installed, starting, by the second system, the second application in advance and notifying the second application to enter the always-on display state.

14. The method according to claim 1, wherein each of the first application and the second application is a dial, a navigation application, a music player, or a message notification bar.

15. The method according to claim 1, wherein the electronic device is arranged with at least a first processor and a second processor with different processing capabilities and power consumptions, and the first processor and the second processor are configured to run the first system and the second system, respectively.

16. An electronic device, comprising a processor and a memory; wherein the electronic device supports running a first system and a second system, and an operating power consumption of the first system is higher than an operating power consumption of the second system; wherein the memory stores at least one segment of a program, the at least one segment of the program being configured to be executed by the processor to implement:

displaying, by the first system, a first application interface of a first application in a screen-on display state;

displaying, by the first system, the first application interface of the first application in an always-on display state, in a case where a device state meets an always-on display condition and the first application interface supports always-on display; wherein the first application is an application installed in the first system;

sending, by the first system, a state entry command to the second system; wherein the state entry command is configured to instruct the second system to enter the always-on display state;

displaying, by the second system, a second application interface of a second application in the always-on display state based on the state entry command; wherein the second application is an application installed in the second system, and the second application and the first application support an always-on display state transition; and entering, by the first system, a dormant state.

17. The electronic device according to claim 16, wherein the processor comprises at least a first processor and a second processor, and wherein the first processor is configured to run a first system and the second processor is configured to run a second system.

18. An electronic device, comprising a processor and a memory; wherein the electronic device supports running a first system and a second system, and an operating power consumption of the first system is higher than an operating power consumption of the second system; wherein the memory stores at least one segment of a program, the at least one segment of the program being configured to be executed by the processor to implement:

displaying, by the first system, a first application interface of a first application in an always-on display state; wherein the first application is an application installed in the first system;

sending, by the first system, a state entry command to the second system, in a case where a duration of entering the always-on display state reaches a duration threshold; wherein the state entry command is configured to instruct the second system to enter the always-on display state;

displaying, by the second system, a second application interface of a second application in the always-on display state based on the state entry command; wherein the second application is an application installed in the second system, and the second application and the first application support an always-on display state transition; and entering, by the first system, a dormant state.

19. The electronic device according to claim 18, wherein the processor comprises at least a first processor and a second processor, and wherein the first processor is configured to run a first system and the second processor is configured to run a second system.

20. An electronic device, comprising a processor and a memory; wherein the electronic device supports running a first system and a second system, and an operating power consumption of the first system is higher than an operating power consumption of the second system; wherein the memory stores at least one segment of a program, the at least one segment of the program being configured to be executed by the processor to implement:

displaying, by the first system, a first application interface of a first application in an always-on display state; wherein the first application is an application installed in the first system;

sending, by the first system, a state entry command to the second system; wherein the state entry command comprises an application identifier of the first application and the state entry command is configured to instruct the second system to enter the always-on display state;

displaying, by the second system, a second application interface of a second application in the always-on display state based on the state entry command; wherein the second application is an application installed in the second system, and the second application and the first application support an always-on display state transition; and entering, by the first system, a dormant state;

wherein a case 1 or a case 2 is satisfied:

in the case 1, the state entry command comprises an application identifier of the first application; the displaying, by the second system, a second application interface of a second application in the always-on display state based on the state entry command comprises:

displaying, by the second system, the second application interface of the second application in the always-on display state, in a case where it is identified based on the application identifier of the first application that the second application is installed;

in the case 2, the state entry command comprises an application identifier of the second application; the displaying, by the second system, a second application interface of a second application in the always-on display state based on the state entry command comprises:

displaying, by the second system, the second application interface of the second application in the always-on display state based on the application identifier of the second application.

21. An electronic device, comprising a processor and a memory; wherein the electronic device supports running a first system and a second system, and an operating power consumption of the first system is higher than an operating power consumption of the second system; wherein the memory stores at least one segment of a program, the at least one segment of the program being configured to be executed by the processor to implement:

displaying, by the first system, a first application interface of a first application in an always-on display state; wherein the first application is an application installed in the first system;

sending, by the first system, a state entry command to the second system; wherein the state entry command is configured to instruct the second system to enter the always-on display state;

displaying, by the second system, a second application interface of a second application in the always-on display state based on the state entry command; wherein the second application is an application installed in the second system, and the second application and the first application support an always-on display state transition; and entering, by the first system, a dormant state;

wherein the second application and the first application are applications with a same function installed separately in the second system and the first system; or, the second application and the first application are a same application installed separately in the second system and the first system; or, the second application and the first application are applications with a same application interface installed separately in the second system and the first system.

22. The electronic device according to claim 21, wherein the processor comprises at least a first processor and a second processor, and wherein the first processor is configured to run a first system and the second processor is configured to run a second system.

23. An electronic device, comprising a processor and a memory; wherein the electronic device supports running a first system and a second system, and an operating power consumption of the first system is higher than an operating power consumption of the second system; wherein the memory stores at least one segment of a program, the at least one segment of the program being configured to be executed by the processor to implement:

displaying, by the first system, a first application interface of a first application in an always-on display state; wherein the first application is an application installed in the first system;

sending, by the first system, a state entry command to the second system; wherein the state entry command is configured to instruct the second system to enter the always-on display state;

displaying, by the second system, a second application interface of a second application in the always-on display state based on the state entry command, comprising:

after the second system obtains the state entry command, starting, by the second system, the second application, and displaying, by the second system, the second application interface of the second application which is the same as the first application interface of the first application; wherein the second application is an application installed in the second system, and the second application and the first application support an always-on display state transition; and entering, by the first system, a dormant state.

24. The electronic device according to claim 23, wherein the processor comprises at least a first processor and a second processor, and wherein the first processor is configured to run a first system and the second processor is configured to run a second system.

25. An electronic device, comprising a processor and a memory; wherein the electronic device supports running a first system and a second system, and an operating power consumption of the first system is higher than an operating power consumption of the second system; wherein the memory stores at least one segment of a program, the at least one segment of the program being configured to be executed by the processor to implement:

displaying, by the first system, a first application interface of a first application in an always-on display state; wherein the first application is an application installed in the first system;

sending, by the first system, a state entry command to the second system; wherein the state entry command is configured to instruct the second system to enter the always-on display state;

in a case where the second system identifies that a second application that supports the always-on display state transition with the first application is installed, starting, by the second system, the second application in advance and notifying the second application to enter the always-on display state;

displaying, by the second system, a second application interface of the second application in the always-on display state based on the state entry command; wherein the second application is an application installed in the second system, and the second application and the first application support an always-on display state transition; and entering, by the first system, a dormant state.

* * * * *